J. S. GAGE.
Horse Hay Fork.
No. 41,499.
Patented Feb. 9, 1864.
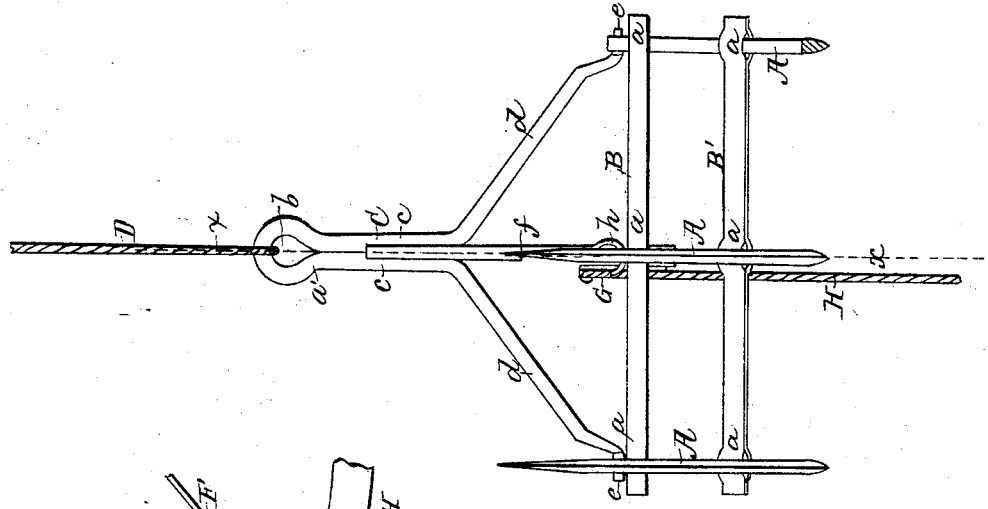
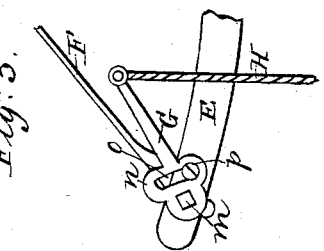
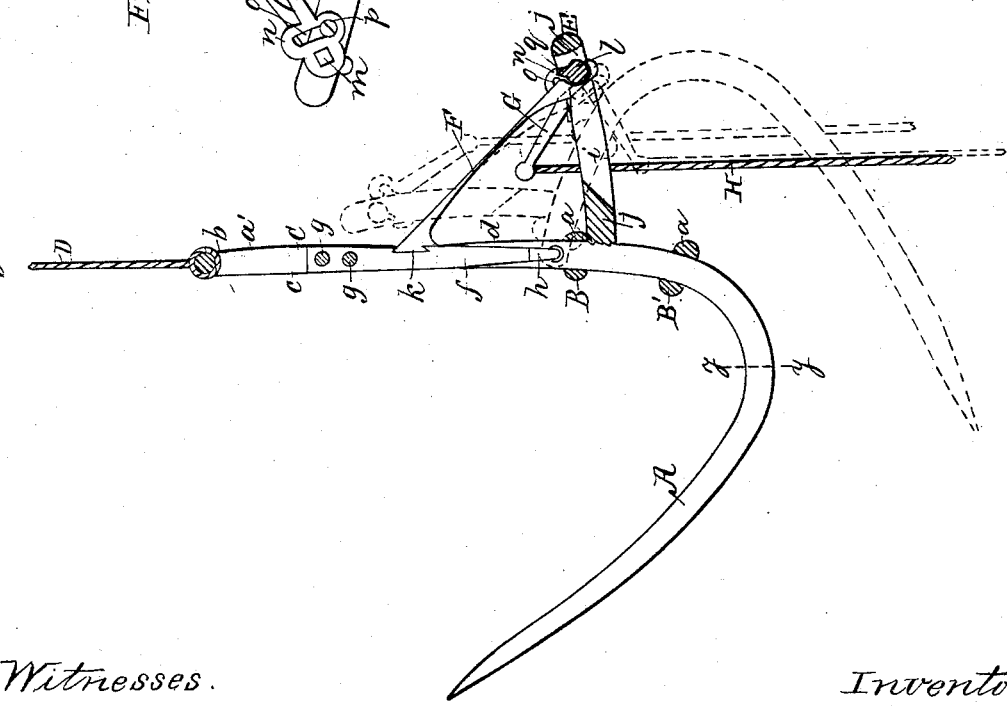
Witnesses.
Inventor.

UNITED STATES PATENT OFFICE.

JOHN S. GAGE, OF DOWAGIAC, MICHIGAN.

IMPROVEMENT IN HORSE HAY-FORKS.

Specification forming part of Letters Patent No. 41,499, dated February 9, 1864.

*To all whom it may concern:*

Be it known that I, JOHN S. GAGE, of Dowagiac, in the county of Cass and State of Michigan, have invented a new and Improved Horse Hay-Fork; and I do hereby declare that the following is a full, clear, and exact description of the same, reference being had to the accompanying drawings, making a part of this specification, in which—

Figure 1 is a side sectional view of my invention, taken in the line $x\ x$, Fig. 2; Fig. 2, a front view of the same, with one of the tines in section, as indicated by the line $y\ y$, Fig. 1; Fig. 3, a detached side view of the tripping or discharging mechanism pertaining to the same.

Similar letters of reference indicate corresponding parts in the several figures.

This invention relates, first, to a novel and improved mode of constructing the fork, as hereinafter fully shown and described, whereby the ordinary head for the tines is avoided and the bail connected directly to the tines, and a very durable and desirable fork obtained.

The invention relates, second, to a novel and improved means for holding the fork in a proper position while being elevated with its load, and for tripping the fork so that it may discharge its load, as hereinafter described.

The object of the invention is to obtain a horse hay-fork of simple construction—one which will be durable or not liable to get out of repair, capable of being manipulated with facility, and of being manufactured at a moderate cost.

To enable those skilled in the art to fully understand and construct my invention, I will proceed to describe it.

A represents the tines of the fork, which may be constructed of steel, and of the usual curved form, three or more being used, as desired. These tines are connected and firmly held in position by metal cross-bars B B', which are constructed or formed with swells $a$, perforated with holes to admit of the inner part of the tines passing through them. The cross-bars B B' may each be constructed out of a single bar or rod, or out of two longitudinal pieces welded together and shrunk on the tines. The uppermost cross-bar, B, is quite near the inner ends of the tines A, and the lower cross-bar, B', is some distance below B, as shown in both figures.

C represents the bail to which the hoisting-rope D is attached. This bail may be constructed of an iron bar, $a'$, bent so as to form an eye, $b$, to which the hoisting-rope is attached, said eye $b$ being at the center of the rod, and the two parts of the latter extending parallel with each other a certain distance, as shown at $c$, and then bent so as to diverge at angles of about forty-five degrees, as shown at $d\ d$, the lower ends of $d\ d$ being bent and rounded to form journals $e\ e$, which pass loosely through the inner ends of the two outer tines A, and at right angles thereto. The bail is provided with a central rod, $f$, the upper end of which is secured by rivets $g$ between the parts $c$ of the bar $a'$, the lower end of said rod $f$ being bent or curved in the form of a hook, $h$, which is fitted loosely in the inner end of the central tine, A. By this arrangement it will be seen that the tines are suspended loosely to the bail C, and are allowed to swing freely therefrom.

To the inner part of the central tine, A, there is permanently secured a metal arm, E, which has a mortise or oblong opening, $i$, made vertically and longitudinally through it. This arm may be constructed of one piece of metal, or of two pieces connected together at a suitable distance apart by cross-pieces $j\ j$, the space or opening $i$ being between the inner ends of said cross-pieces.

F represents a spring-brace, the upper end of which is permanently attached to the central rod, $f$, of the bail C, as shown at $k$. This spring-brace may be constructed of steel—that at least would be the preferable material—and its lower end is flattened and has a semicircular recess, $l$, made in its upper edge to receive a circular pin or rod, $m$, in the outer part of the opening $i$ in the arm E. This semicircular recess $l$ in the lower end of the spring-brace F, and the pin $m$, form a catch or fastening to enable the spring-brace F to hold the fork in a proper position so that the latter may retain its load while being elevated to the desired spot, as shown in tint in Figs. 1 and 2. The rod $m$ is allowed to turn in the arm E, and to one end of said rod there is attached a lever, G, which has a rope, H, connected to its lower end. The lever G is flattened where it is connected to the rod $m$, as shown at $n$, and said flattened portion has a segment-slot, $o$, made in it to receive a pin, $p$, which projects from the arm E, said pin serving as a stop to limit the movement of the lever G. On the rod $m$, within the opening $i$, there is a spur, $q$. This arrangement of the lever G and spur $q$ on the rod $m$ is for the purpose of tripping the fork so that it may discharge its load, which is done by the attendant or operator pulling the rope H, the lever G thereby turning the rod $m$ so that the spur $q$ will press down the lower end of the spring-brace F and free it from the rod $m$. The fork then drops or the tines A swing down, as shown in red outline in Fig. 1, and the load falls.

The fork is loaded as follows: The spring-brace F is drawn back near to the tines, and the elevator grasps the bail near its upper end with the left hand, and with his right hand grasps the lower cross bar, B', and raises the fork, which is balanced in his right hand, the tines entering the hay perpendicularly. The bail C is then shoved forward until the recess $l$ of the brace-bar catches under the rod $m$. The fork is then ready to be elevated.

By this construction and arrangement a very strong and durable horse hay-fork is obtained, and one which may be operated or manipulated with the greatest facility.

Having thus described my invention, what I claim as new, and desire to secure by Letters Patent, is—

1. The attaching of the bail C directly to the tines A of the fork, in connection with cross-bars B B', one or more, for securing the tines in proper position, substantially in the manner as and for the purpose herein set forth.

2. The spring-brace F, connected to the bail C, and provided at its lower end with a recess, $l$, in connection with the rod $m$ in the arm E, provided with the spur $q$ and the lever G, all arranged to operate substantially as and for the purpose specified.

JOHN S. GAGE.

Witnesses:
STRAWTHER BOWLING,
NOEL B. HOLLISTER.